United States Patent
Tracy

(10) Patent No.: US 7,255,436 B2
(45) Date of Patent: Aug. 14, 2007

(54) EYEWEAR RETENTION DEVICE

(76) Inventor: Michael Tracy, 182 E. 95th St., Apt. 10-F, New York, NY (US) 10128

( * ) Notice: Subject to any disclaimer, the term of this patent is extended or adjusted under 35 U.S.C. 154(b) by 40 days.

(21) Appl. No.: 11/140,831

(22) Filed: May 31, 2005

(65) Prior Publication Data

US 2006/0268222 A1 Nov. 30, 2006

(51) Int. Cl.
*G02C 5/22* (2006.01)
(52) U.S. Cl. ..................... 351/155; 2/209.13
(58) Field of Classification Search ........... 351/156, 351/157, 158, 41; 2/452, 209.13; 242/380, 242/402
See application file for complete search history.

(56) References Cited

U.S. PATENT DOCUMENTS

| 3,673,610 | A | 7/1972 | Linutaud |
| 4,276,657 | A | 7/1981 | Montesi |
| 5,488,441 | A | 1/1996 | Pomatti |
| 5,898,472 | A | 4/1999 | Oshikawa |
| 5,905,560 | A | 5/1999 | Daniel |
| 6,237,159 | B1 | 5/2001 | Martin |
| D450,744 | S | 11/2001 | Rhoades et al. |
| 6,547,388 | B1 | 4/2003 | Bohn |
| 6,637,074 | B1 | 10/2003 | Morris |
| 6,671,885 | B2 | 1/2004 | Viggiano |
| 6,905,206 | B2 | 6/2005 | Skuro |
| 6,918,669 | B1 * | 7/2005 | Tamborrino ............. 351/158 |
| 7,013,491 | B2 * | 3/2006 | Ferrara ................. 2/209.13 |
| 2002/0069489 | A1 | 6/2002 | Morris |
| 2004/0051845 | A1 | 3/2004 | Steere |

OTHER PUBLICATIONS

FREETIME101 "X-Cap" BX101 (Hat with retractable eyewear holder); www.freetime101.com, PO BOx 1174, Williston VT 05495.

* cited by examiner

*Primary Examiner*—Hung Xuan Dang
(74) *Attorney, Agent, or Firm*—Gorman Law Offices

(57) ABSTRACT

An eyeglass retention device that allows eyewear to be securely worn and alternately securely retained on headwear. This device provides the above in a sporty, practical, yet low profile manner for all types of eyewear users, and with all types of headwear.

10 Claims, 8 Drawing Sheets

EYEWEAR RETENTION DEVICE

BACKGROUND OF THE INVENTION

1. Field of the Invention

The present invention relates to an eyewear retention device which allows eyewear such as eyeglasses, sunglasses or goggles, when not in direct use, to be worn in a set position on head gear or headwear such as caps, baseball caps, helmets, etc. without falling off or being lost or damaged.

2. Description of the Related Art

Many people wear eyewear, such as prescription eyeglasses, sunglasses, goggles, etc. for sports, work, reading, eye protection, or for fashion purposes. However, normal use of eyewear is problematic as it often gets lost, broken, misplace, or falls off a user. For example, in some cases eyewear may be kept in a pocket or handbag. However, carrying eyewear in a pocket or handbag has the disadvantage that people frequently forget where they have placed their glasses and are unable to reach them when necessary. Such carrying also causes breakage and loss. The glasses may be accidentally dropped upon taking them out of the pocket or handbag.

Alternatively, it is also common to see people carrying their glasses hanging down on their chests, by means of a simple strap, string or cord with clips at either end attached to the frame of the glasses. However, such straps or cords are inconvenient or easily forgotten behind when using eyewear of different types. Furthermore, hanging eyeglasses from the neck as shown is quite inconvenient, given that the straps sway and are a hindrance to movement. Moreover, when engaging in sports or otherwise intense movements, glasses hanging from the neck sway and/or flop about with each movement of the body. Additionally, the glass can break and cause injury if one should accidentally fall down. As such, it is common to see people wear their eyewear perched on their headgear, but of course, this too is problematic as it often leads to breakage or loss when the glasses fall off the headwear, or lost when they are placed aside somewhere so as not to fall off the headgear.

In these regards, none of the prior art solutions offer a way to avoid the above described problems.

SUMMARY OF THE INVENTION

It is therefore an object of the present invention to, among others, overcome deficiencies in the prior art such as noted above.

It is also an object of the present invention to provide an eyewear retention device that is convenient to consistently use, easily retained, and offers a practical yet sporty, slim-type profile for daily use. In this regard, the present invention permits carrying of eyewear by retaining them around the face with a constant tension, but also allows setting and resetting of the eyewear on the headwear to be performed with a single swift movement. It causes little or no hindrance during activities such as sports, is fashionable, highly durable, can be produced at low cost, and its operation can easily be controlled. The present invention is advantageous in that it may allow a user to easily and freely place their eyewear on their headwear from their face (and vice versa), and is especially useful for all manner of active users, such as athletes, joggers, bikers, skate boarders, construction workers, military, police, etc. To this end, the invention may be used on all manner of head wear or headgear, whether it be hunting hats, baseball caps, helmets, hardhats, sun visors, or any other type of head gear, and may also be used for all manner of eyewear, whether it be prescription eyeglasses, sunglasses, safety glasses, goggles, etc.

Additional objects, advantages and other novel features of the invention will be set forth in part in the description that follows and in part will become apparent to those skilled in the art upon examination of the following or may be learned with the practice of the invention.

BRIEF DESCRIPTION OF THE DRAWINGS

The accompanying drawings, which are incorporated in and constitute a part of the specification, illustrate a preferred embodiment of the invention and, together with the general description given above, and the detailed description of the preferred embodiment given below, serve to explain the principles of the invention.

DETAILED DESCRIPTION OF THE PREFERRED EMBODIMENTS

In its broadest embodiment, the present invention relates to an eyewear retention device comprising: a pair of cords, each having an exterior end and an interior end; an eyeglass frame attachment portion at each said exterior end of each of the pair of cords; a pair of housing means for respectively anchoring the respective interior end of each of the cords, and for housing a given portion of the cords; a pair of headwear attachment means for respectively attaching each of said housing means to an article of headwear; and a winding mechanism pair, each respectively disposed within each of the housing means, for tensioning the cords, and for drawing into and out of the housing means the cords. In one embodiment, each of the housing means further comprises a rotary mechanism for providing rotation of a potion of the housing means relative to the headwear attachment means. Furthermore, the winding mechanism pair may also be structured so as to provide a substantially constant or uniform inward directed tension of the cords throughout all phases of use of the device, and may further include a torsion spring that is substantially in equilibrium when the respective cord is wound about an inner reel such that the cord is generally contained within the winding mechanism, whereby the torsion spring exerts a retracting force when the strap is extended outside of the reel. As will be detailed herein, the rotary mechanism may be either an axle and hub type, or a peripheral track type, while the headwear attachment means may be either a clip type, a hook and loop type, or a headwear material integrated type.

Figure 1:
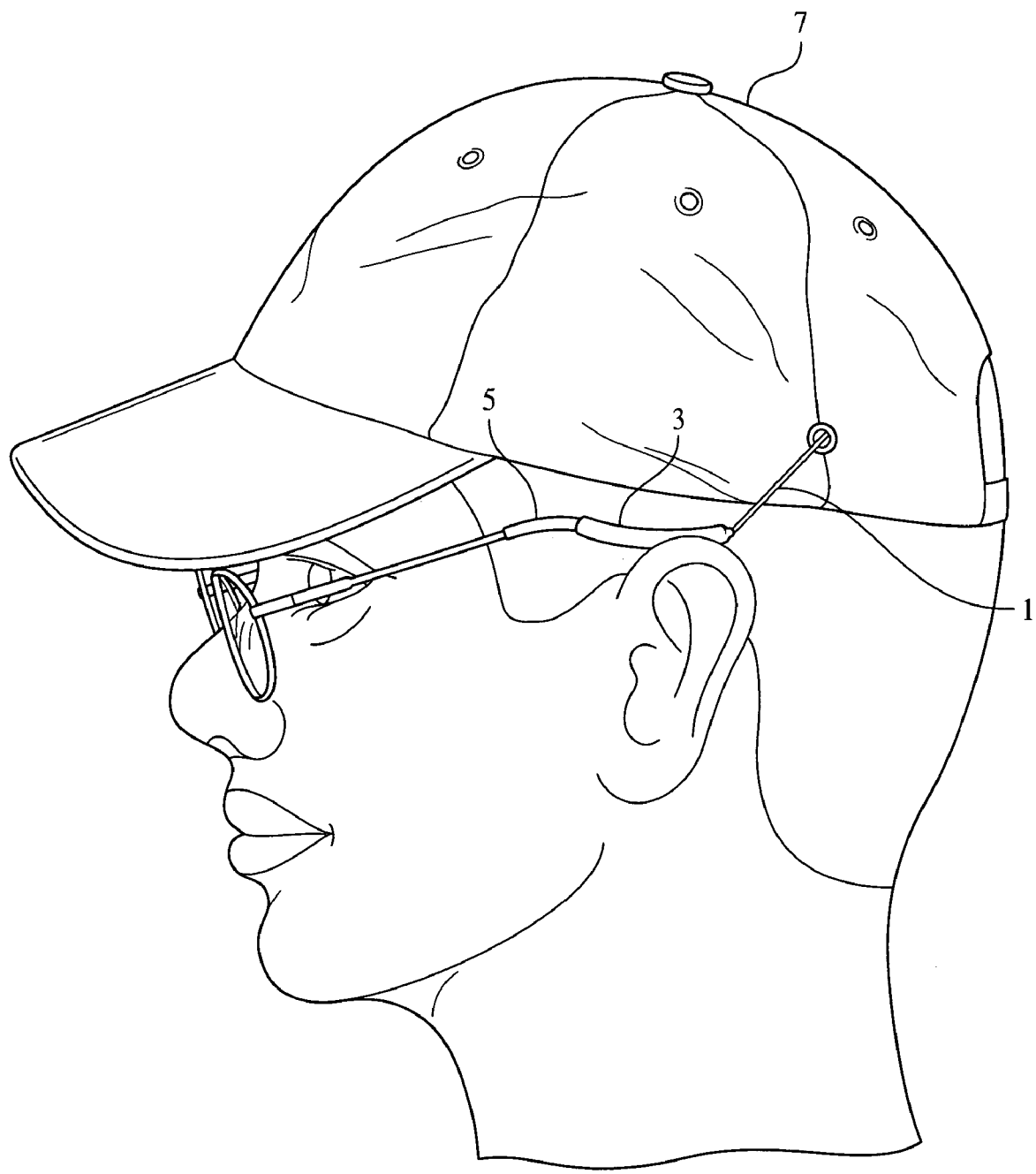
FIG. 1 is a side view of user wearing eyewear and headwear, and utilizing an embodiment of the invention while wearing said eyewear.
Figure 2:
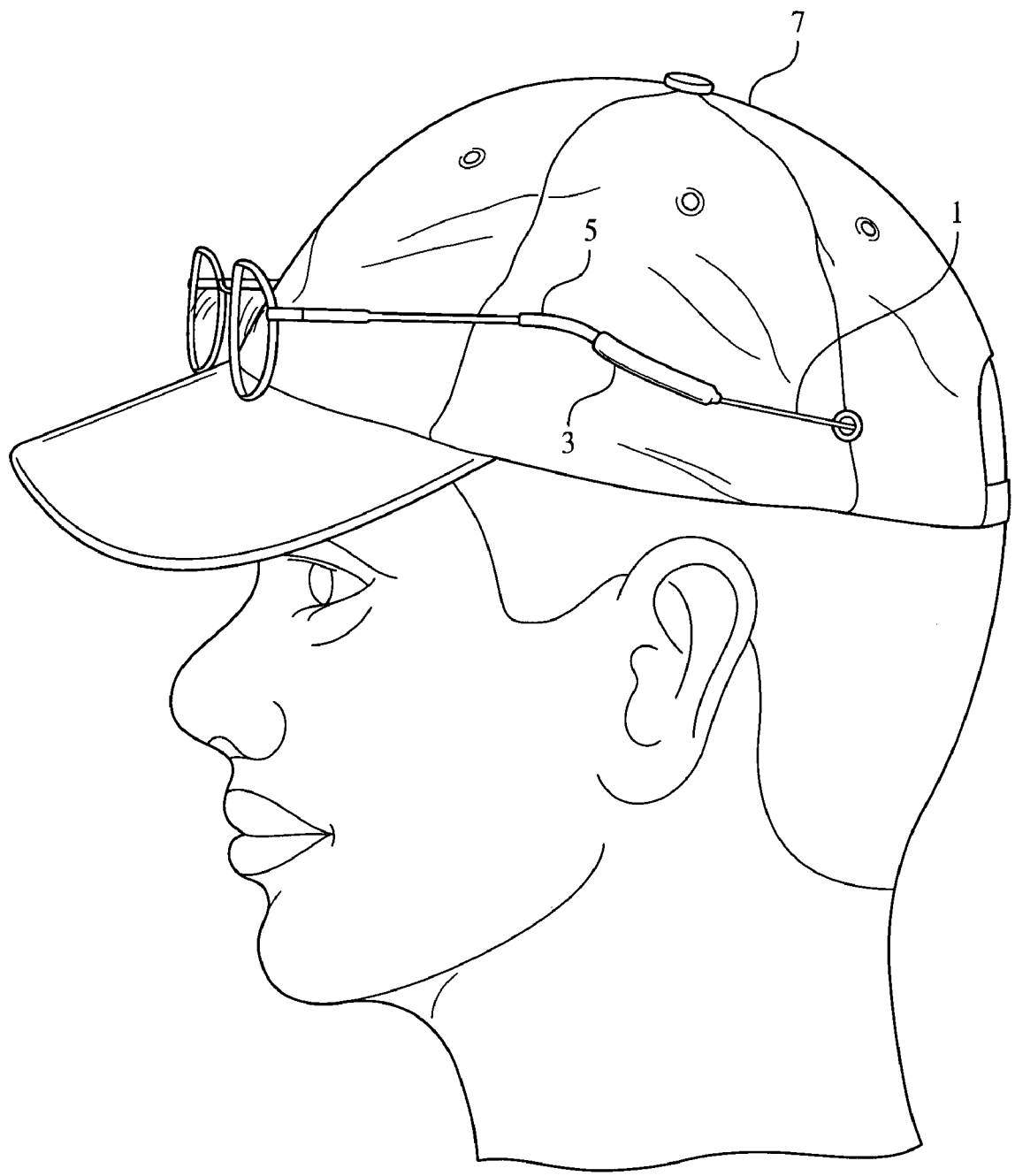
FIG. 2 is a side offset view of user wearing eyewear and headwear, and utilizing an embodiment of the invention while resting said eyewear on said headwear.
Figure 3A:
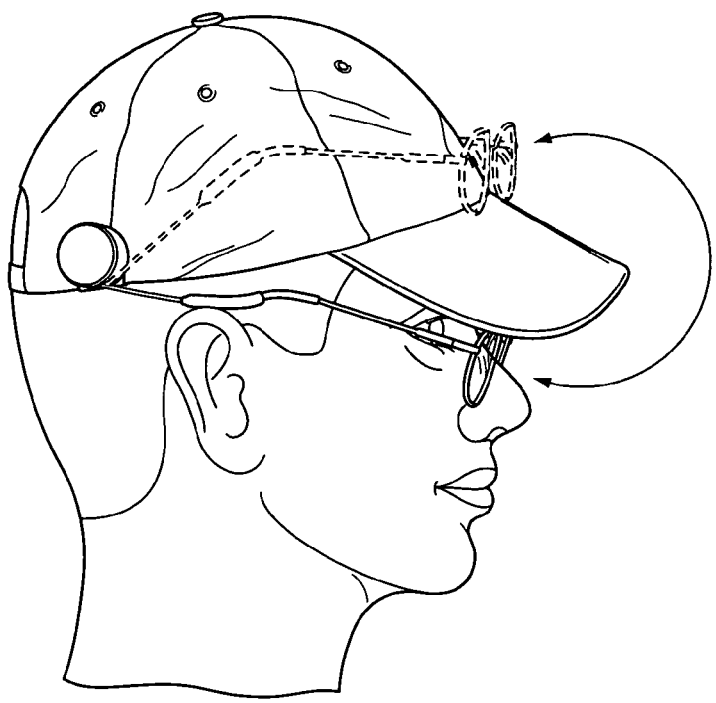
FIGS. 3(a)-(d) are collectively perspective views of various stages of employment of the present invention with eyewear and headgear, as used by the wearer from when on his face to removing from said face, pulling out and rotating up toward rest on said headgear.
Figure 3B:
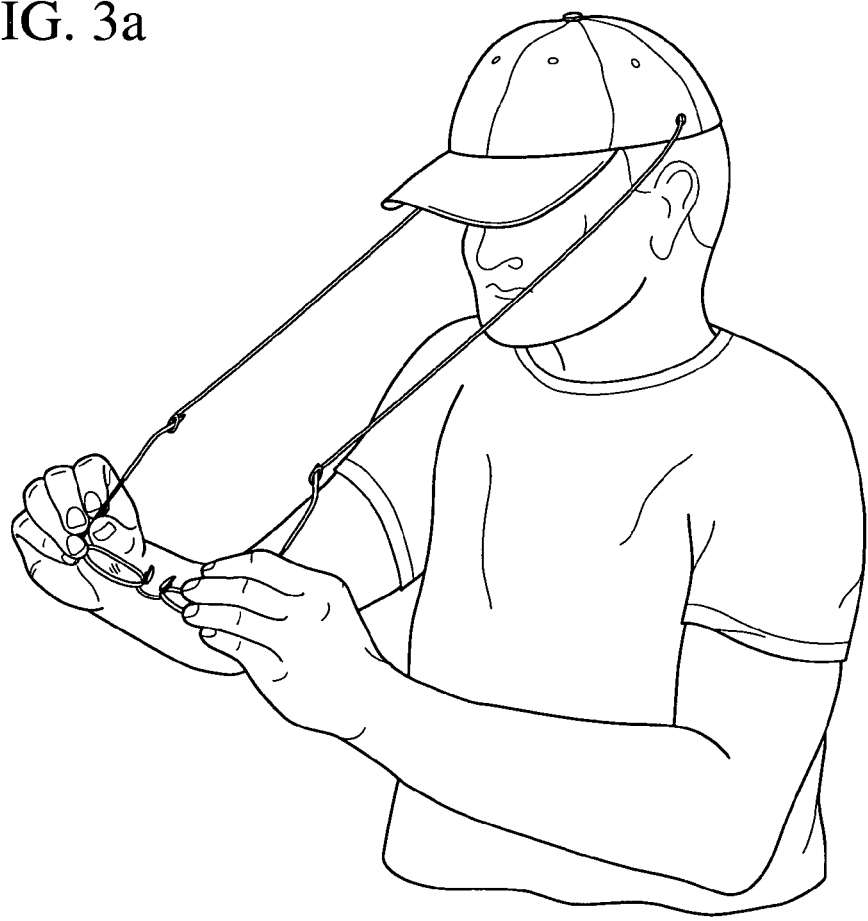
Figure 3C:
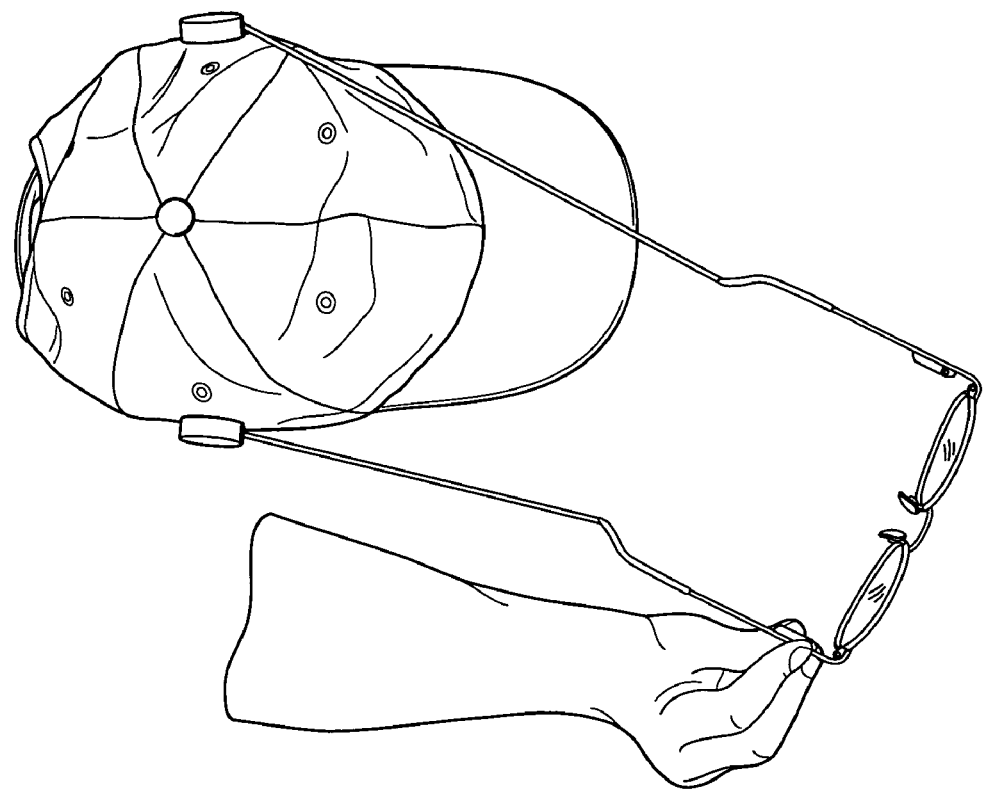
Figure 3D:
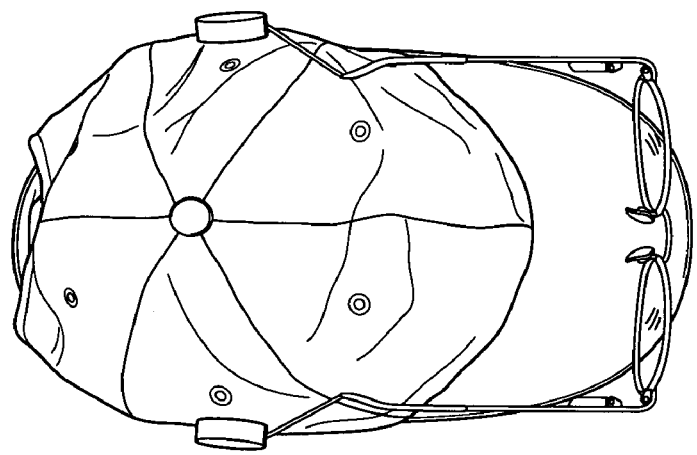

Reference will now be made in detail to the present preferred embodiment of the invention as illustrated in the accompanying drawings. FIG. 1 is a side view of user wearing eyewear 5 and headwear 7, and utilizing an embodiment of the invention while wearing eyewear, which is, in one embodiment (as currently depicted in FIG. 1) largely embedded or affixed inside or integral to headwear 7, so as to provide a fashion forward, low profile, which offers a practical, convenient alternative to messy, awkward and/or clumsy strings as know in the prior art, and to further offer an alternative to perching eyewear on headgear in an unsecured fashion, and/or to prevent loss due to misplaced eyewear. FIG. 2 is a side offset view of the same exemplary embodiment seen in FIG. 1 above, but with the user utilizing the invention while resting eyewear 5 on headwear 7 in a secured fashion that prevents loss, falls, or breakage that typically occurs when one moves, bends over, etc., at a time when the user has perched or rested eyewear on headgear, or when user removes the eyewear in an attempt to prevent the same.

Turning to FIG. 3, we specifically see FIG. 3(*a*)-(*c*), which are collectively differing perspective views of various stages of employment of the present invention along with eyewear 5 and headgear 7, and respectively, as used by the wearer from when eyewear 5 is securely situated on his face in FIG. 3(*a*), to the point of removing the eyewear from said face in FIG. 3(*b*), a top-down view of an exemplary pulling out and rotating up eyewear 5 in FIG. 3(*c*) toward rest in FIG. 3(*d*) on headgear 7. Note that all times, whether in the stages depicted in FIGS. 3(*a*), 3(*b*), 3(*c*), or 3(*d*), the housing means 9 provides, in a preferred embodiment, a substantially constant, omnipresent tension back (e.g. inward toward housing means 9) along cords 1 to each respective housing means 9, thereby helping secure the eyewear from falling off a user's face, or headwear 7, and furthermore, provides a force that renders the cords snag-free, and helps the user to easily and rapidly guide into place eyewear 5 onto headwear 7, or alternatively, onto a users face. As further seen in FIG. 3(*d*), axis x at 25 aligns a vertical plane that might laterally bisecting exemplary headgear 7. In the normal range of usage, the cords 1 extend and retract into and from housing 9 in a way that is roughly parallel to axis x at 25 (more or less depending on the actual width of eyewear 5), and as will be detailed hereafter, will also typically rotate about a center axis y at 27 in a substantially parallel planar fashion to axis x at 25. However, it is also important to note that cords 1 are flexible, and as such may deviate significantly from said parallel movement about axis x at 25, as indicated in the exemplary flexible range of movement exhibited in FIG. 3(*c*). The present invention, therefore is to provide two retractable cord devices (having the structure described hereafter), clipped, velcroed, sewn, embedded, or otherwise affixed on an exterior or interior surface of each side of the headwear (approximately above or near the ears of the wearer of the headgear) such that the cord devices allow the cord to be stretched out when the user brings the eyewear over the user's face and/or a brim of headwear 7 to wear the eyewear 5, and retracts when glasses are rested back on headwear 7.

Figure 4A:
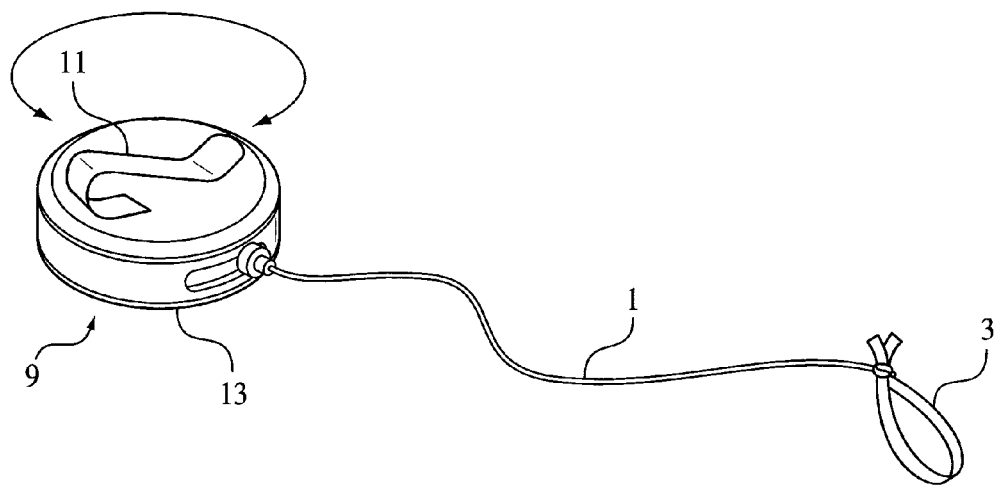
FIGS. 4(a)-(c) are collectively perspective views of two embodiments of the housing means and attachment means types, including a rotary mechanism for providing rotation of the housing means relative to the headwear attachment means/housing means, and views of the cord emanating from each, as well as the full range of rotational movement that the installed device is capable of, relative to a vertical plane laterally bisecting exemplary headgear.
Figure 4B:
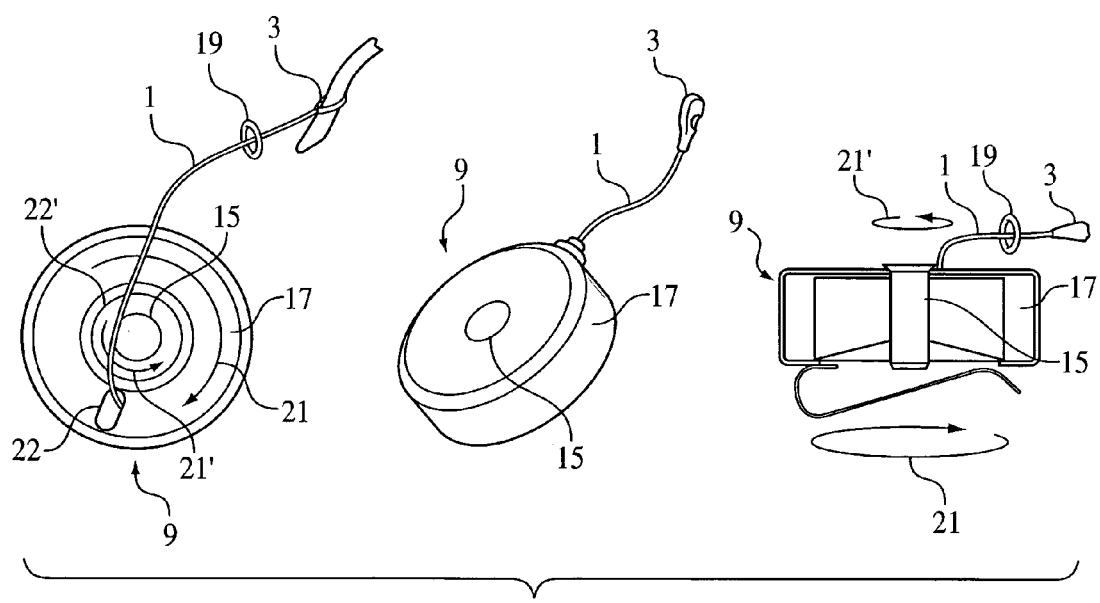
Figure 4C:
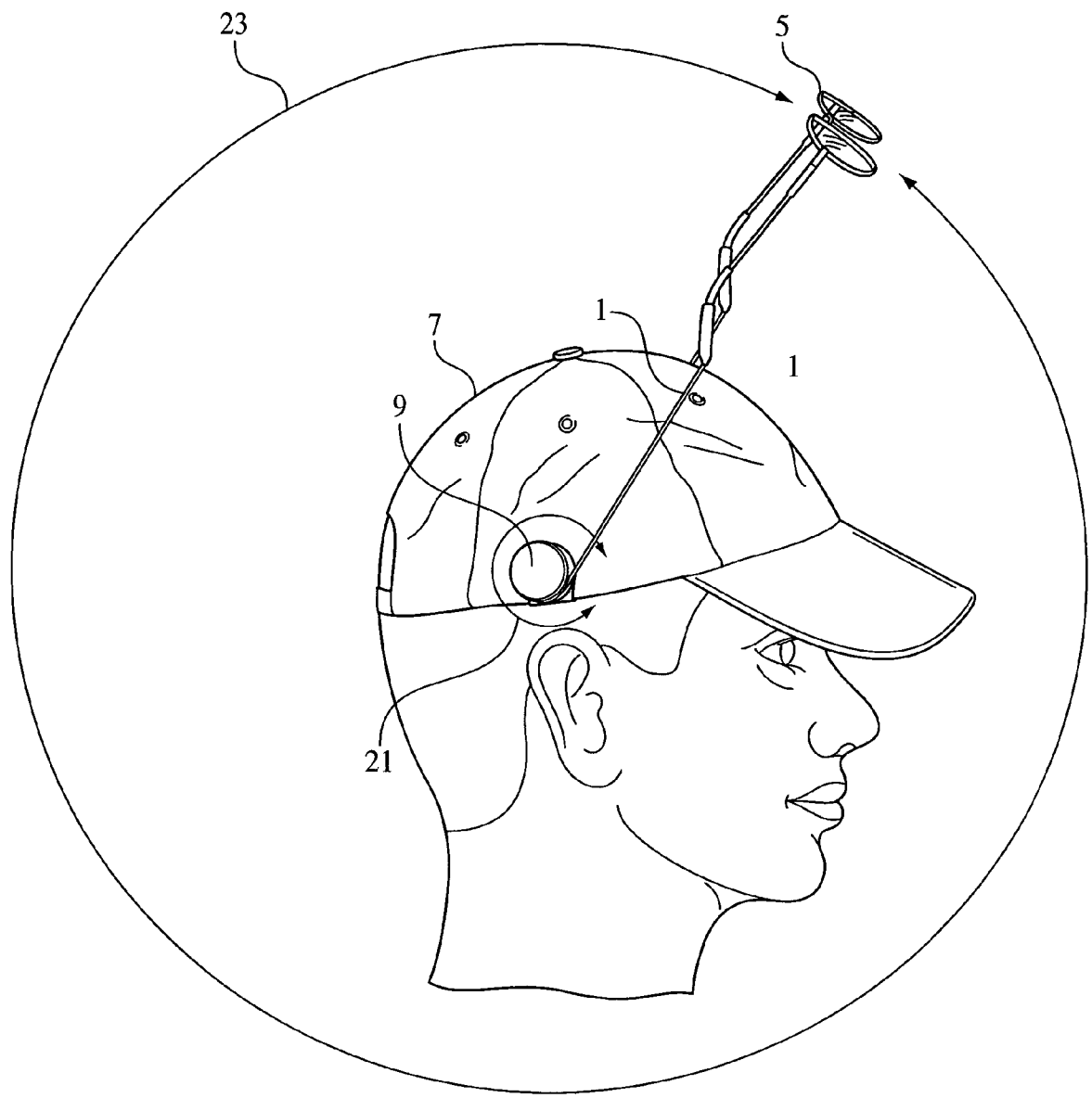

The actual housing means and all of the innards therein, such as the winding mechanism, etc. will, in one embodiment, operate roughly akin to employee badge cord tensioner devices individuals use to pull out and retract their badge on a secure leash, as readily available on the commercial market. The retraction and winding of cords 1 may be accomplished through the use of a winding mechanism (preferably including at least a torsion spring and inner reel)(not depicted) as is commonly known in the art, but in one embodiment, will utilize technology described in U.S. Pat. Nos. 4,678,135 (Jones) and 4,711,409 (Jones), both of which are hereby incorporated by reference in their entirety. However, in the present invention, the housing 9 is modified from a standard badge retractor unit in at least one crucial way when compared to standard cord tensioner devices: in a preferred embodiment, cord 1 emanates such that it may also rotate in a 360 degree manner about an axis z which is substantially perpendicular to a top and a bottom of housing means 9. Thus, as seen in FIG. 4, in one embodiment at FIG. 4(*a*) the circumference of housing means 9 has been modified and provided with a track and circumferential aperture 13 so as to allow for 360 degree rotation about axis z at 29 and along tracks 16 of the access aperture 14 where cord 1 enters the housing 9. The 360 degree access affords versatile (e.g., full 360 degree, so that a user may wear headgear in either direction) rotation about axis y at 27 and provides a constant, slight tension when in any position (except when fully retracted, e.g., when not in use with eyewear 5 at all), so that headwear 7 and the user's face both are subjected to a slight pull so that the glasses are maintained in place. In this case, it is noted that headwear attachment means (an exemplary variant of which is depicted at 11) is solidly attached to housing means 9 according to a peripheral track type so as to stay situated along with housing 9 while cord 1 emanates from the rotary mechanism 15 (comprising access aperture 14 radially traversable along periphery of housing 9 through track and circumferential aperture 13). As provided, housing 9 may be affixed to headwear 7 through headwear attachment means 11 by a clip (as exemplarily depicted in FIG. 4(*a*)), by a hook and loop securement, (such as the Velcro® brand product)(not depicted), or by headwear material integrated type (e.g., sewn, materially embedded in headwear such as plastic helmets)(not depicted), or otherwise affixed.

In another embodiment, however, housing 9 is also modified from a standard badge retractor unit so that cord 1 emanates such that it not only rotates in a 360 degree manner about an axis z at 29 which is substantially perpendicular to a top 22 and a bottom 24 of housing means 9, but owing to an opening or aperture 22 situated at a top (or alternatively, in a different type of embodiment, the circumferential side for somewhat more limited movement compared to situation of aperture 22 at said top) of housing 9 in FIG. 3(*b*), cord 1 emanates not along the circumference of housing 9, but out through the top 22, so as to permit three dimensional hemispherical emanation of cord 1. Thus, housing 9 may be situated either internal or external to the exterior surface of headgear 7, but may in one preferred embodiment, be situated internally (as also further described hereafter in FIG. 6) by threading cord 1 through a control eyelet 19 that allows prevents cord 1 from entanglement, and allows it to emanate from within headgear 7 to the outside where it may be thereafter affixed to eyewear 5. Thus, when provided as such, this particular embodiment also permits rotation about axis y at 27 and provides a constant, slight tension when in any position (except when fully retracted, e.g., when not in use with eyewear 5 at all), such that headwear 7 and the user's face both are subjected to a slight pull so that the glasses are maintained in place. In this embodiment, it is further noted that an axle and hub type of headwear attachment means (an exemplary variant of which is depicted at 11) is such that it is solidly attached to a portion 24 housing means 9 so as to remain in a static position while another portion 17 of housing 9 rotates in a full 360 degree manner about axis z at 29, while aperture 22 allows the winding mechanism (not depicted) to wind and unwind cord 1 across a substantially hemispherical (e.g., substantially three dimensional range of motion) which can be controlled as needed by usage of control eyelet 19, which also allows cord 1 to exit an internal situation to the exterior environment of headgear 7 as needed. As provided then, housing 9 may be affixed to headwear 7 through headwear attachment means 11 by a clip (as exemplarily depicted in FIG. 4(b)), by a hook and loop securement, (such as the Velcro® brand product) (not depicted), or by headwear material integrated type (e.g., sewn, materially embedded in headwear such as plastic helmets)(not depicted), or otherwise affixed.

In providing the embodiments above, housing 9 may be made of almost any material, although plastic or nylon may be most preferred, and similarly, the size may be of any dimensions (e.g., smaller for trim headgear such as baseball cap used with sunglasses, and larger for heavy duty gear, such as construction or other helmets used with say, safety goggles), but in any case, may in one embodiment, range diameter from 0.5" to 3.75" (with typical embodiments being approximately 0.5" in diameter). Moreover, in cases where the embodiment is one the second variety described above and depicted in FIG. 3(b), then the shape need not be substantially circular, and can even be rectangular, square, circular, or freeform. As for cord 1, it may be of any material as known in the art, such as nylon or any other usable material, and may be of many lengths, but in a typical embodiment will range from 3" (for child size versions) to 16" for heavy duty versions. Housing 9 may be situated or affixed to headgear 7 almost anywhere that is substantially alongside the side part of headgear 7 as a user might wear it, but this of course will vary depending on the type of headgear (e.g. light gauge hats compared to heavy duty helmets), and depending on the positioning of the headgear (e.g., some hats may be worn frontwards or backwards, so it may be best to situate housing 9 substantially central, or even perhaps, predominantly forward or backward to the hat, depending on primary orientation).

Figure 5:
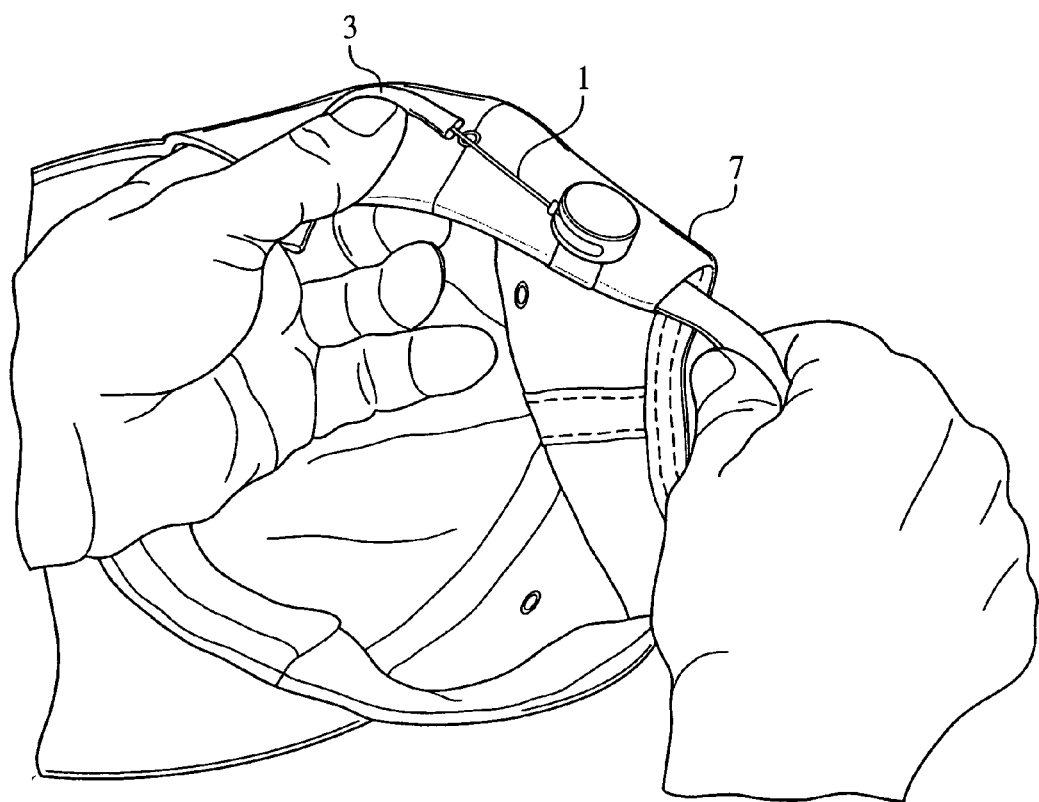
FIG. 5 is a side, offset view of one embodiment of the invention, as situated on the outside of exemplary headgear, and as secured by a clip means.
Figure 6:
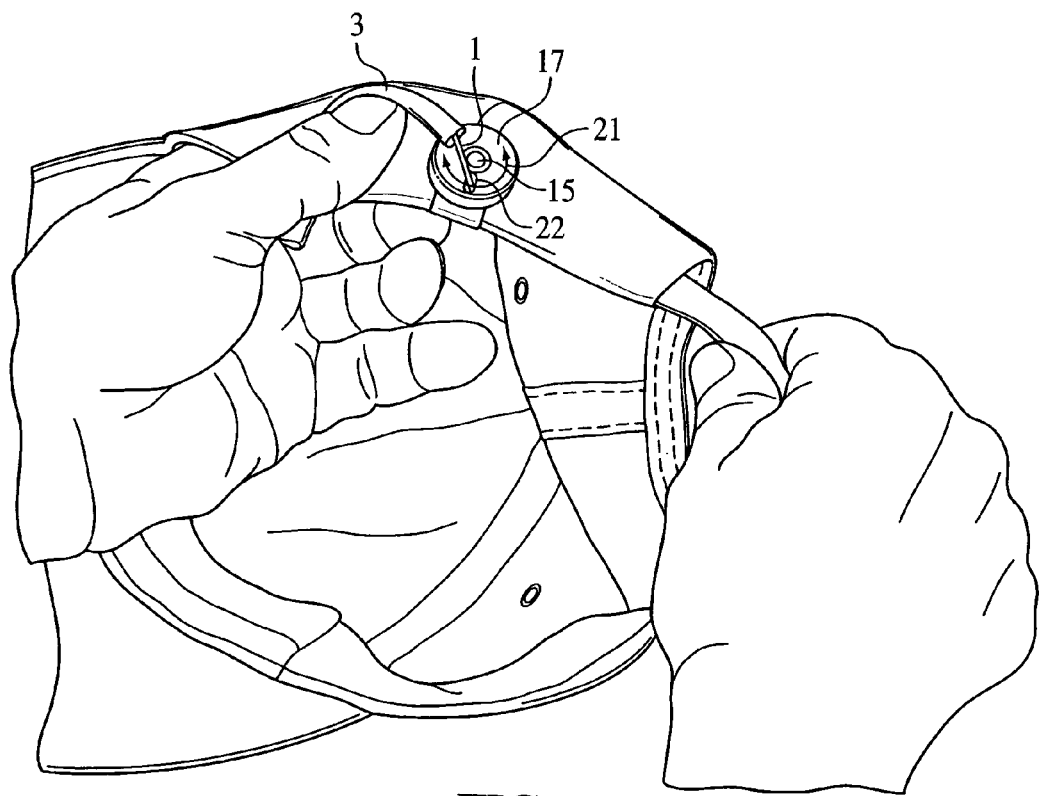
FIG. 6 is a side, offset perspective cutaway view of one embodiment of the invention, as situated on the inside of exemplary headgear, and as secured by either a headgear material integrated type or hook and loop means.

Turning then to FIGS. 5 and 6, are exemplary depictions of the above described housing pairs being situated directly on the exterior of exemplary headgear 7 (in this case, by exemplary headwear attachment means of clips, which may be particularly useful as an aftermarket add-on to a favorite piece of headgear, or alternatively, for helmets) in FIG. 5, or for a more compact, low profile purpose as illustratively depicted in FIG. 6, where housing 9 is situated comfortably inside headgear 7 (e.g., recessed or padded within headgear 7 structure, and potentially of almost any shape as needed to fit therein), or integral with the material of headgear 7 (particularly useful for helmets and the like, and may also be of many different shapes, if needed, or may be molded, sewn, formed, or otherwise fitted therein). In any of the case, the method of affixing housing 9 and guiding cord 1 may be effectuated as described above.

Figure 7A:
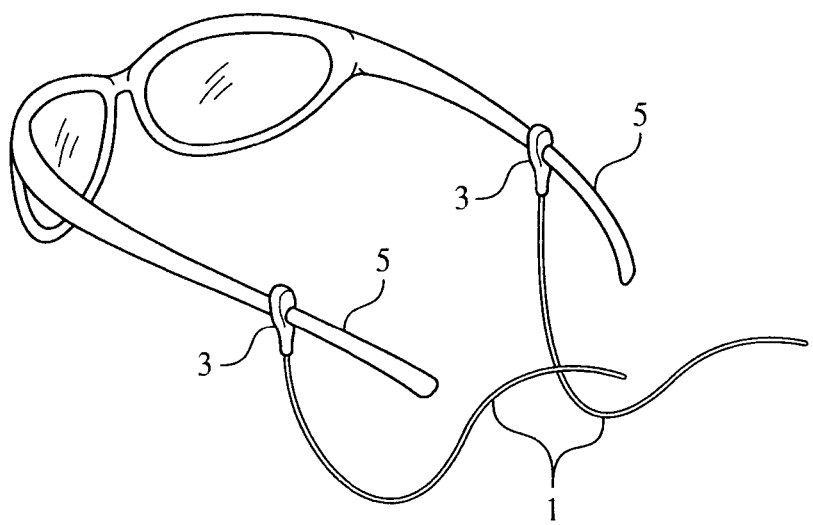
FIGS. 7(a)-(c) are a side, offset views of various possible embodiments of the eyeglass frame attachment portion of the invention, as attached to exemplary eyewear.
Figure 7B:
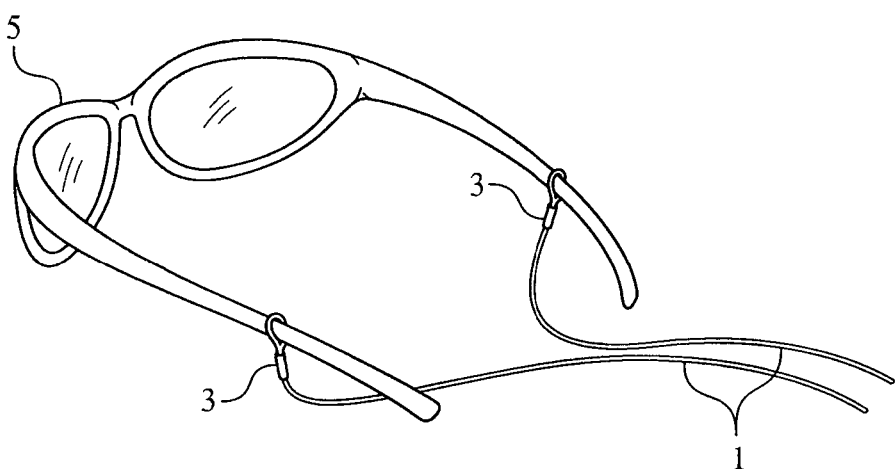
Figure 7C:
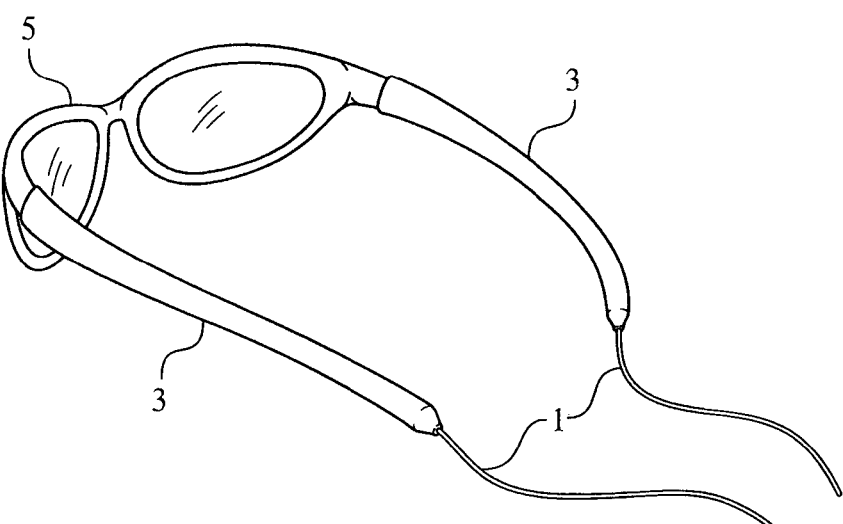

Lastly, as illustratively depicted in FIG. 7, the eyewear attachment means 3 may be of many types, whether simple "noose" type as seen in FIG. 7(c), or whether of elastic (e.g., neoprene, spandex, rubber, plastic, etc.) sleeve type as seen in FIGS. 7(b), (c) and (e), or as a clamping slot type as seen in FIG. 7(a). Clearly, as one skilled in the art can appreciate, eyewear attachment means 3 may be formed in numerous ways, of many different materials as needed for a given user or type of eyewear.

The foregoing description of the specific embodiments reveals the general nature of the invention such that others can—by applying current knowledge—readily modify and/or adapt for various applications such specific embodiments without departing from the generic concept, and therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention. It is to be understood that the invention is not limited to the illustrations described and shown herein, which are deemed to be more illustrative of the best modes of carrying out the invention, and which are susceptible of modification of form, size, arrangement of parts and details of operation. Hence, all such modifications are within the spirit and scope of the appended claims.

What I claim is:

1. An eyewear retention device comprising:
   a pair of cords, each having an exterior end and an interior end;
   an eyewear frame attachment portion at each said exterior end of each of said pair of cords;
   a pair of housing means for respectively anchoring the respective interior end of each of said cords, and for housing a given portion of said cords;
   a pair of headwear attachment means for respectively attaching each of said housing means to an article of headwear;
   a winding mechanism pair, each respectively disposed within each of said housing means, for tensioning said cords, and for drawing said cords into and out of the housing means, said winding mechanism pair each providing a substantially constant inwardly-directed tension of said cords; and
   said pair of housing means each further comprising a rotary mechanism for providing rotation of a portion of said housing means relative to said headwear attachment means.

2. The retention device according to claim 1, wherein each said rotary mechanism for providing rotation of a portion of said housing means relative to said headwear attachment means further contains at least one aperture, said aperture being structured in conjunction with rotary mechanism so as to permit a 360° rotation in a substantially planar fashion about an axis, and so as to further permit significant deviations from said 360° rotation in a substantially planar fashion about an axis, thereby permitting movement about at least one additional axis.

3. The retention device according to claim 2, wherein the cord has a length between 4 and 36 inches.

4. The retention device according to claim 1, wherein said winding mechanisms includes a torsion spring that is substantially in equilibrium when the respective cord is wound about an inner reel such that the cord is generally contained within the winding mechanism, whereby the torsion spring exerts a substantially uniform retracting force when the strap is extended outside of the reel.

5. The retention device according to claim 4, wherein said rotary mechanism is an axle and hub type.

6. The retention device according to claim 5, wherein said headwear attachment means is a clip type.

7. The retention device according to claim 5, wherein said headwear attachment means is a headwear material integrated type.

8. The retention device according to claim 5, wherein said aperture is formed according to a substantially circular or elongated opening on said rotary mechanism.

9. The retention device according to claim 4, wherein said rotary mechanism is a peripheral track type.

10. The retention device according to claim 9, wherein said headwear attachment means is a hook and loop type.

\* \* \* \* \*